United States Patent [19]
Unno et al.

[11] Patent Number: 5,329,458
[45] Date of Patent: Jul. 12, 1994

[54] DEVICE AND METHOD FOR DETECTING POSITION OF EDGE OF CUTTING TOOL

[75] Inventors: Kunihiko Unno, Kariya; Kazuhiko Sugita, Anjo; Tetsuro Shibukawa, Nagoya; Yoichi Yamakawa, Aichi; Hiromichi Ohta, Anjo, all of Japan

[73] Assignee: Toyoda Koki Kabushiki Kaisha, Kariya, Japan

[21] Appl. No.: 858,487

[22] Filed: Mar. 27, 1992

[30] Foreign Application Priority Data

Mar. 27, 1991 [JP] Japan .................. 3-089724

[51] Int. Cl.$^5$ .................. G06F 15/46
[52] U.S. Cl. .................. 364/474.37; 364/474.17
[58] Field of Search .................. 250/548, 557, 572; 356/249, 351, 356, 363, 399–401, 124, 375, 383; 82/1.11, 12; 364/474.37, 474.16–474.18

[56] References Cited

U.S. PATENT DOCUMENTS

| | | | |
|---|---|---|---|
| 3,812,376 | 5/1974 | Takeyama et al. | 250/572 |
| 4,601,581 | 7/1986 | Covey et al. | 356/383 |
| 4,854,707 | 8/1989 | Ring et al. | 356/356 |
| 5,024,527 | 6/1991 | Harrison | 356/124 |
| 5,070,250 | 12/1991 | Komatsu et al. | 250/548 |
| 5,171,999 | 12/1992 | Komatsu et al. | 250/548 |

FOREIGN PATENT DOCUMENTS 4023236 1/1991 Fed. Rep. of Germany .
2455266 11/1980 France .
WO89/04946 6/1989 PCT Int'l Appl. .

OTHER PUBLICATIONS

Precision Engineering, Oct. 1989 vol. 11 No. 4, "Computer vision based station for tool setting and tool form measurement", T. D. Doiron, pp. 231–238.

Primary Examiner—Jerry Smith
Assistant Examiner—Jim Trammell
Attorney, Agent, or Firm—Oblon, Spivak, McClelland, Maier & Neustadt

[57] ABSTRACT

A device for detecting a position of an edge of a cutting tool includes a reference plate positioned to form a slit between the edge of the cutting tool and the reference plate. The slit extends in a direction transverse to the longitudinal direction of the cutting tool. A laser light source is provided to irradiate a laser light to the slit. A detecting device detects a diffraction pattern created through diffraction of the laser light by the slit. A processing device is provided to determine the position of the edge of the cutting tool based on an output signal of the detecting device.

7 Claims, 13 Drawing Sheets

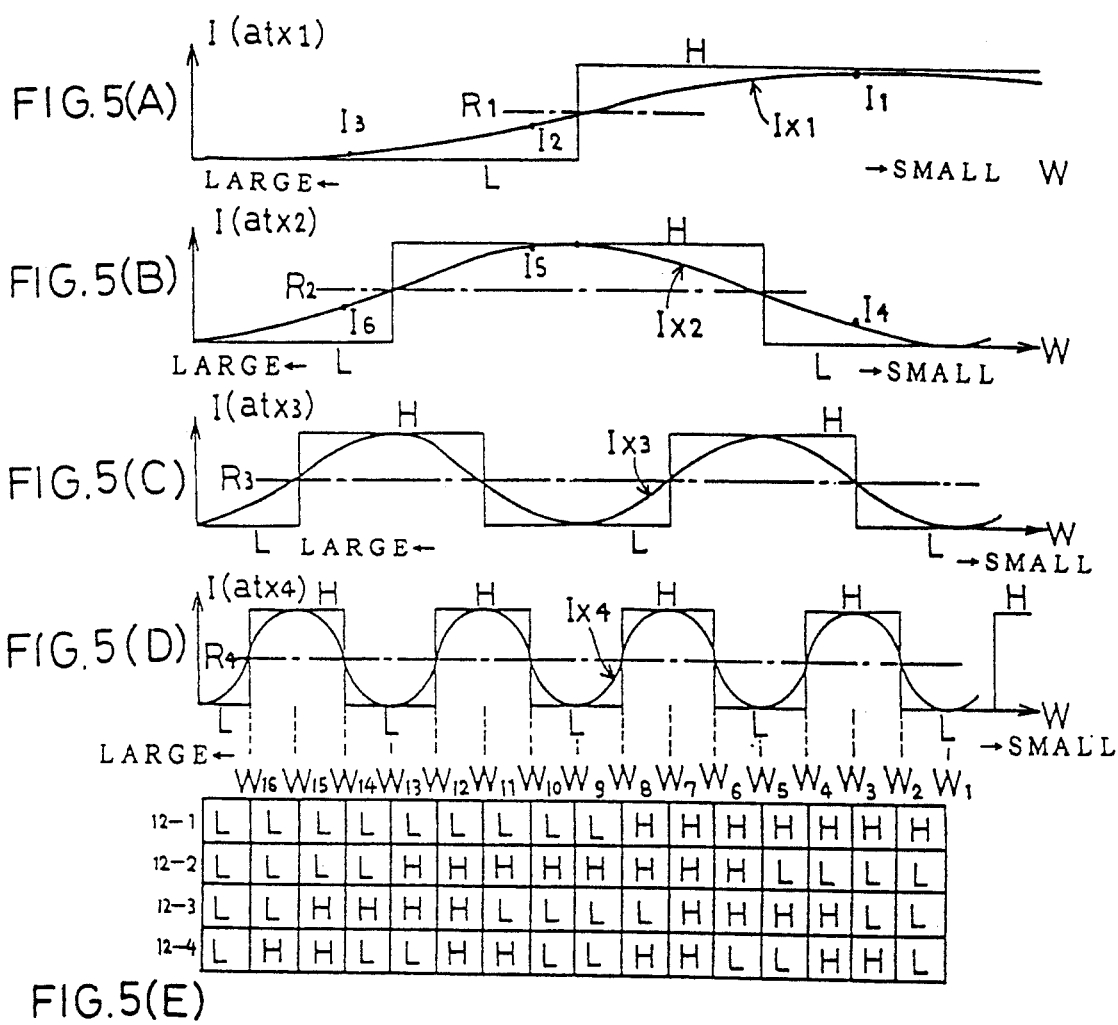

DEVICE AND METHOD FOR DETECTING POSITION OF EDGE OF CUTTING TOOL

BACKGROUND OF THE INVENTION

1. Field of the Invention

The present invention relates to a device and method for detecting a position of an edge of a cutting tool.

2. Description of the Prior Art

To accurately detect a position of an edge of a cutting tool, a conventional method is proposed to pick up an image of the edge of the cutting tool by an image pick-up device such as a CCD camera (a camera using charge-coupled devices) with the image enlarged by a microscope, and thereafter to process the image so as to detect the position of the edge of the cutting tool with respect to the microscope or the image pick-up device. Such method is disclosed in PRECISION ENG. (Butterworth & Co., Ltd.), 1989, Oct., Vol. 11, No. 4, Page 231.

In case that a region of 2 mm×2 mm is picked up by the CCD camera for picture elements of 1024×1024 using the above method, one of the picture elements corresponds to 2 µm×2 µm. Generally, in a process of extracting the position of a contour line, etc. by image processing, the accuracy of position of the contour line is degraded by about one figure compared with a resolution of one picture element. Therefore, with the above method, it is difficult to detect the position of the edge of the cutting tool or a configuration of the same by order of micron. To improve the detecting accuracy, it requires to use a microscope of large magnifying rate which is difficult to be applied at a working place.

Further, since the device requires a special light source in addition to such microscope of large magnifying rate, the construction of the device becomes rather complicated and the size of the device becomes larger.

SUMMARY OF THE INVENTION

It is, accordingly, an object of the present invention to provide a device which can detect highly accurately a position of an edge of a cutting tool with a simple construction.

According to the present invention, there is provided a device for detecting a position of an edge of a cutting tool comprising:
- a reference plate positioned to form a slit extending in a direction transverse to the longitudinal direction of the cutting tool between the edge of the cutting tool and the reference plate;
- a laser light source for irradiating a laser light to the slit;
- a detecting device for detecting a diffraction pattern created through diffraction of the laser light by the slit; and
- a processing device for determining the position of the edge of the cutting tool based on an output signal of the detecting device.

Further, according to the present invention, there is also provided a method for detecting a position of an edge of a cutting tool comprising the steps of:
- positioning a reference plate in front of the edge of the cutting tool to form a slit extending in a direction transverse to the longitudinal direction of the cutting tool between the edge of the cutting tool and the reference plate;
- irradiating a laser right to the slit;
- detecting a diffraction pattern created through diffraction of the laser light by the slit; and
- determining the position of the edge of the cutting tool based on the detected alternating light pattern.

In the present invention, the position of an edge of a cutting tool is calculated from the diffraction pattern created through diffraction of the laser light by the slit. Therefore, it is not necessary to use an optical magnifying system such as a microscope for detecting the position of the edge, and the position of the edge can be calculated highly accurately.

The invention will become more fully apparent from the claims and the description as it proceeds in connection with the drawings.

BRIEF DESCRIPTION OF THE DRAWINGS

FIGS. 5(A) to 5(D) are graphs showing the relation between the width and the light intensity at different positions;

FIG. 5(E) is a table showing combinations of high and low signals from the group of sensors;

DETAILED DESCRIPTION OF THE PREFERRED EMBODIMENT

Preferred embodiments of the present invention will be hereinafter explained with reference to drawings.

First Embodiment

Figure 1:
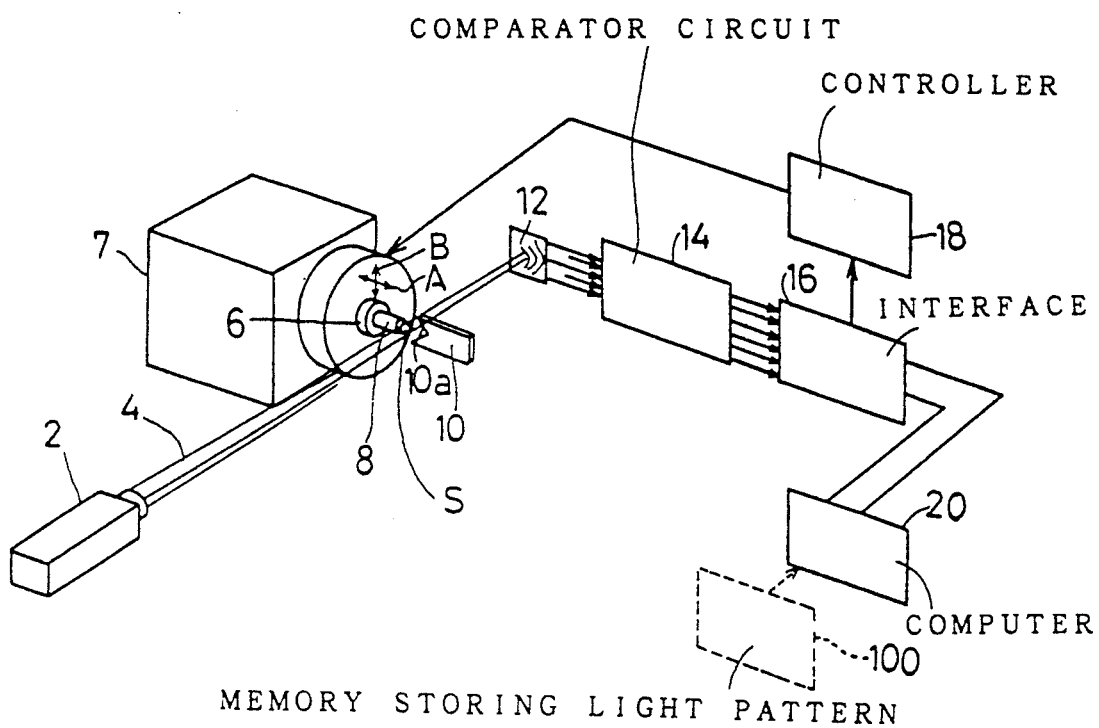
FIG. 1 is a schematic perspective view of a device for detecting a position of an edge of a cutting tool according to a first embodiment of the present invention.

Referring to FIG. 1, there is shown a schematic view of a system of the first embodiment.

A cutting tool 8 is held by a tool holder 6 mounted on a tool base 7. The tool holder 6 is driven by a drive device (not shown) disposed within the tool base 7 to move in a longitudinal direction of the cutting tool 8 (a direction shown by an arrow A) and also in a vertical direction (a direction shown by an arrow B) perpendicular to the direction A. The tool holder 6 can be fixed relative to the tool base 7 after it has been moved to a predetermined position.

Figure 2:
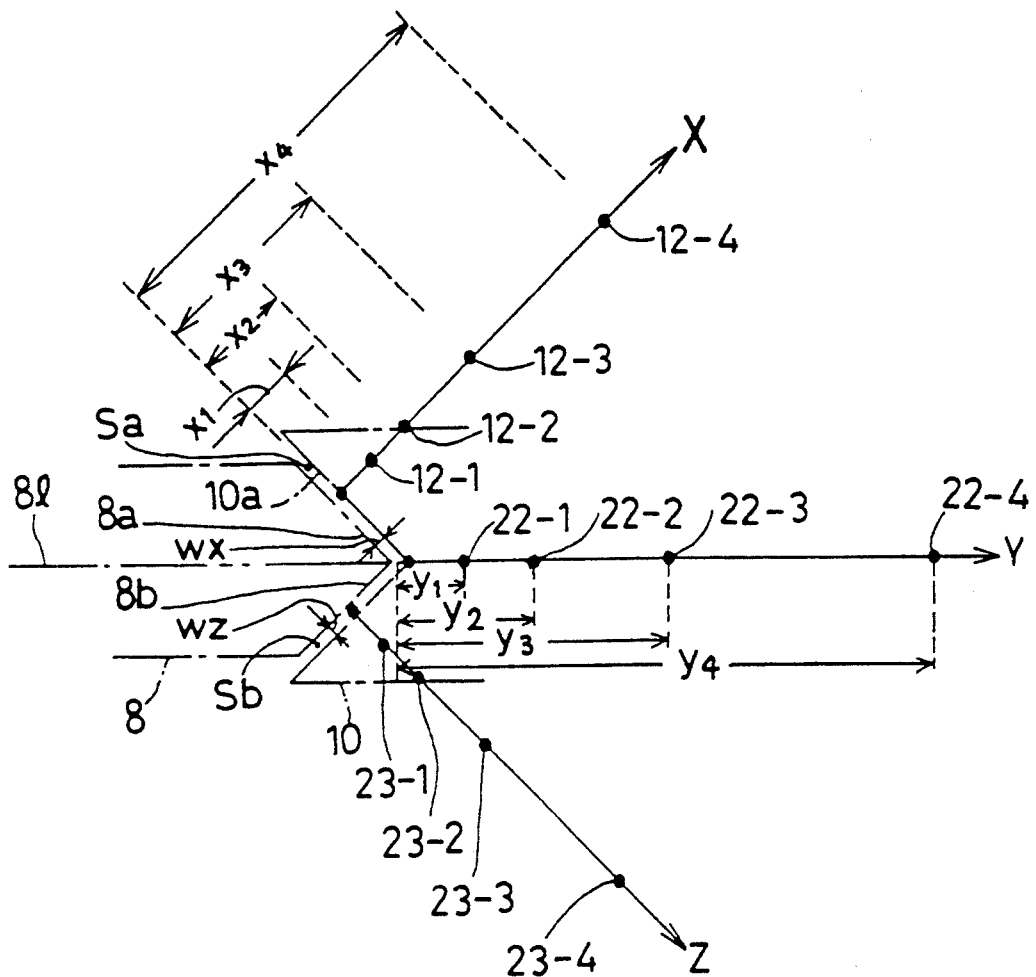
FIG. 2 is a diagram showing the positioning of the groups of the sensors shown in FIG. 1.

A reference plate 10 has a substantially V-shaped edge 10a corresponding substantially to a pair of edge portions 8a, 8b forming an edge of the cutting tool 8 (see FIG. 2). The reference plate 10 is fixed to a bed (not shown) to have a predetermined positional relationship with the tool base 7. A substantially V-shaped slit S having a very small width is formed between the edge poritons 8a, 8b of the cutting tool 8 and the edge 10a of the reference plate 10. The slit S includes a slit portion Sa formed between the edge portion 8a of the cutting tool 8 and the edge 10a of the reference plate 10, and a slit portion Sb formed between the edge portion 8b of the cutting tool 8 and the edge 10a of the reference plate 10.

A laser light source 2 is fixed to a position to irradiate a laser light 4 in a direction toward the slit S.

A group of light sensors 12 are fixed to a position opposite to the laser light source 2 of the slit S.

As shown in FIG. 2, the group of the light sensors 12 include a first group of photo-diodes 12-1 to 12-4 disposed along a direction X perpendicular to the slit portion Sa corresponding to the edge 8a of the cutting tool 8, a second group of photo-diodes 23-1 to 23-4 disposed along a direction Z perpendicular to the slit portion Sb corresponding to the edge portion 8b of the cutting tool 8, and a third group of photo-diodes 22-1 to 22-4 disposed along a direction Y corresponding to a longitudinal direction of the cutting tool 8 parallel to a central line 8l of the cutting tool 8 extending from a pointed end of the same.

The positions of the photo-diodes 12-1 to 12-4 are determined in such a manner that the proportion of their distances x1, x2, x3 and x4 from the slit portion Sa becomes 1:2:4:8. The photo-diodes 23-1 to 23-4 are disposed symmetrically with the photo-diodes 12-1 to 12-4 with respect to the central line 8l of the cutting tool 8. The positions of the photo-diodes 22-1 to 22-4 are determined in such a manner that the proportion of their distances y1, y2, y3 and y4 from the slit portion Sb becomes 1:2:4:8 as that of the photo-diodes 12-1 to 12-4. The photo-diodes 22-1 to 22-4 are spaced away from each other at a larger distance than that of the photo-diodes 12-1 to 12-4 or the photo-diodes 23-1 to 23-4 in proportion to the ratio of the size of the slit S in the direction Y to that in the direction X.

Figure 3:
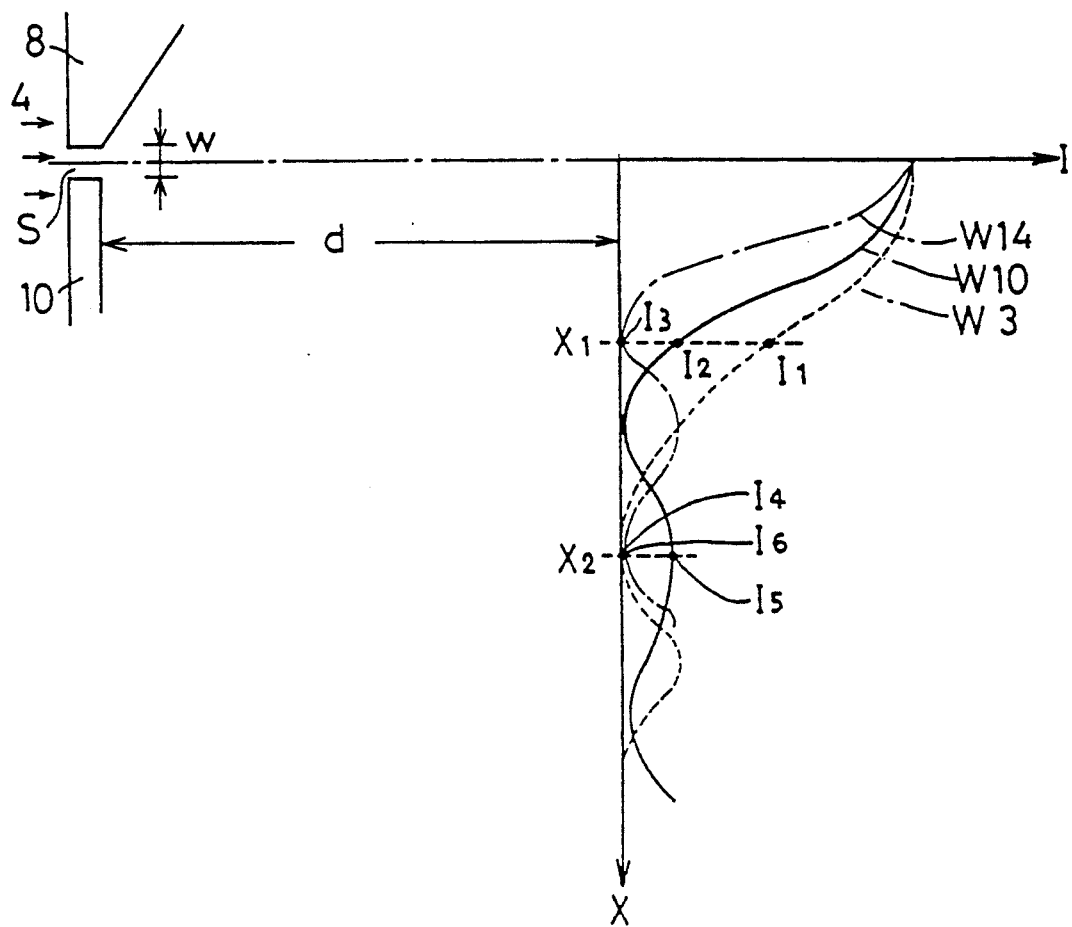
FIG. 3 is a diagram showing a kind of diffraction pattern.

FIG. 3 is a diagram showing distribution of light intensity I at a position away from the slit portion Sa by a distance d when the laser light 4 having wave length λ has been irradiated toward the slit S having width W. As is well known, diffraction stripes are produced at a rear side of the slit Sa, and therefore a diffraction pattern (Fraunhofer diffraction pattern) is created. The pitch of the diffraction stripes becomes larger as the width W of the slit Sa becomes smaller. In FIG. 3, W3, W10 and W14 correspond to the width W of the slit Sa which are small, medium, and large, respectively.

For example, the photo-diode 12-1 disposed away from the slit portion Sa by a distance x1 detects intensity I1, I2 and I3 when the slit width is W3, W10 and W14, respectively. Thus, intensity I(atx1) detected by the photo-diodes 12-1 varies with the slit width W as shown in FIG. 5(A). In FIG. 5(A), the slit width W becomes smaller in a right hand direction.

Similarly, the photo-diode 12-2 is disposed away from the slit portion Sa by the distance x2 detects intensity I4, I5 and I6 when the slit width is W3, W10 and W14, respectively. FIG. 5(B) shows change of intensity (Iatx2) detected by the photo-diode 12-2.

Further, the photo-diode 12-3 disposed away from the slit portion Sa by the distance x3 detects intensity I(atx3) as shown in FIG. 5(C), and the photo-diode 12-4 disposed away from the slit portion Sa by the distance x4 detects intensity I(atx4) as shown in FIG, 5(D).

In FIGS. 5(A) to 5(D), although the slit width W is shown by the same scale in their horizontal coordinates, the intensity is shown by different scales from each other in their vertical coordinates.

The above description is also applicable to the photo-diodes 22-1 to 22-4 disposed in the direction Y and the photo-diodes 23-1 to 23-4 disposed in the direction Z. The distribution of light intensity in the X, Y and Z directions is thus detected by the group of the sensors 12. The values detected by the group of the sensors 12 are inputted to comparators disposed within a comparator circuit 14 and are compared with set values R1 to R4 as shown in FIGS. 5(A) to 5(D) so as to be converted into signals showing whether the intensity is high (H) or low (L).

The above signals are inputted to a computer 20 through an interface 16 shown in FIG. 1. The computer 20 judges the distribution of intensity (I) from the combination of the H and L signals outputted from the comparator circuit 14. The computer 20 thereafter determines a distance Wz between the edge portion 8a of the cutting tool 8 and the edge 10a of the reference plate 10 shown in FIG. 2 by using a table shown in FIG. 5(E).

FIG. 5(E) shows how the slit width W corresponds to the combination of the H and L signals corresponding to the photo-diodes 12-1 to 12-4. For example, if the slit width W has a size between W1 to W2 which are of very small width, only the photo-diode 12-1 disposed at the position x1 receives the light of high intensity, and all of the other diodes 12-2 to 12-4 receive the light of low intensity.

As will be seen from FIG. 5(E), sixteen kinds of combination exist for the H and L signals corresponding to the photo-diodes 12-1 to 12-4 and correspond to any of different slit width by one to one relation. The same H and L signal combination may not appear for different slit width.

The computer 20 can therefore determine the slit width W from the combination of the H and L signals.

Thus, in this embodiment, the computer 20 determines the slit width W from the combination of the H and L signals, and subsequently calculates the position of the edge of the cutting tool 8 with respect to the reference plate 10.

Figure 6:
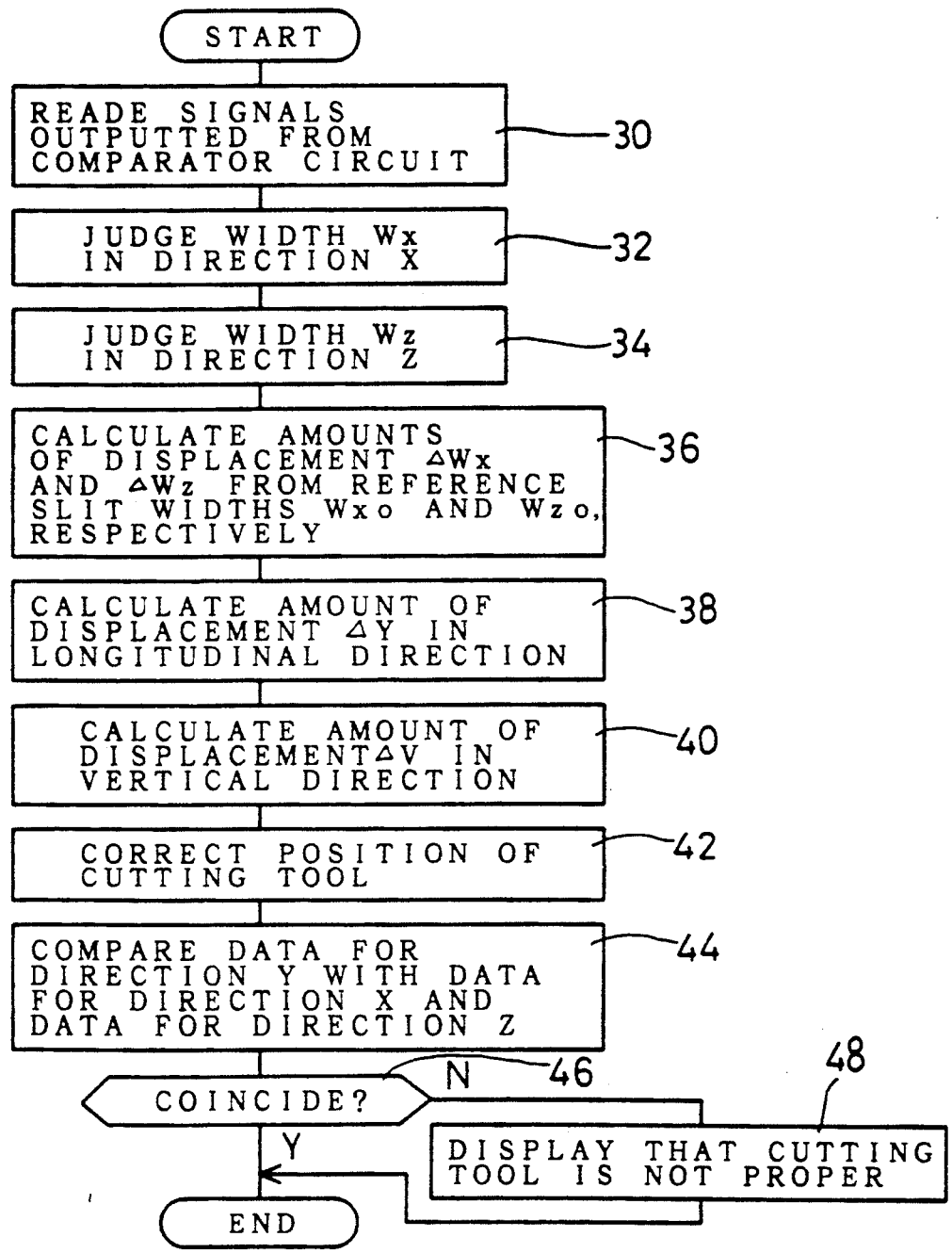
FIG. 6 is a flow chart showing the process performed by the computer shown in FIG. 1.

To this end, the computer 20 performs a process shown by a flow chart in FIG. 6. Firstly, the output signals from the comparator circuit 14 are read in step 30, and a slit width Wx in the direction X and a slit width Wz in the direction Z are determined at steps 32 and 34. Thereafter, amounts of displacement ΔWx and ΔWz from their respective reference positions RPa and RPb are calculated in step 36. In steps 38 and 40, an amount of displacement ΔY in the longitudinal direction of the cutting tool 8 and an amount of displacement ΔV in the vertical direction perpendicular to the longitudinal direction are calculated from the following expressions:

$$\Delta Y = \Delta Wx \cdot \sin\theta + \left( \frac{\Delta Wz}{\tan 2\theta} + \frac{\Delta Wx}{\sin 2\theta} \right) \cdot \cos\theta \quad (1)$$

$$\Delta V = \Delta Wz \cdot \cos\theta + \left( \frac{\Delta Wz}{\tan 2\theta} + \frac{\Delta Wx}{\sin 2\theta} \right) \cdot \sin\theta \quad (2)$$

Figure 7:
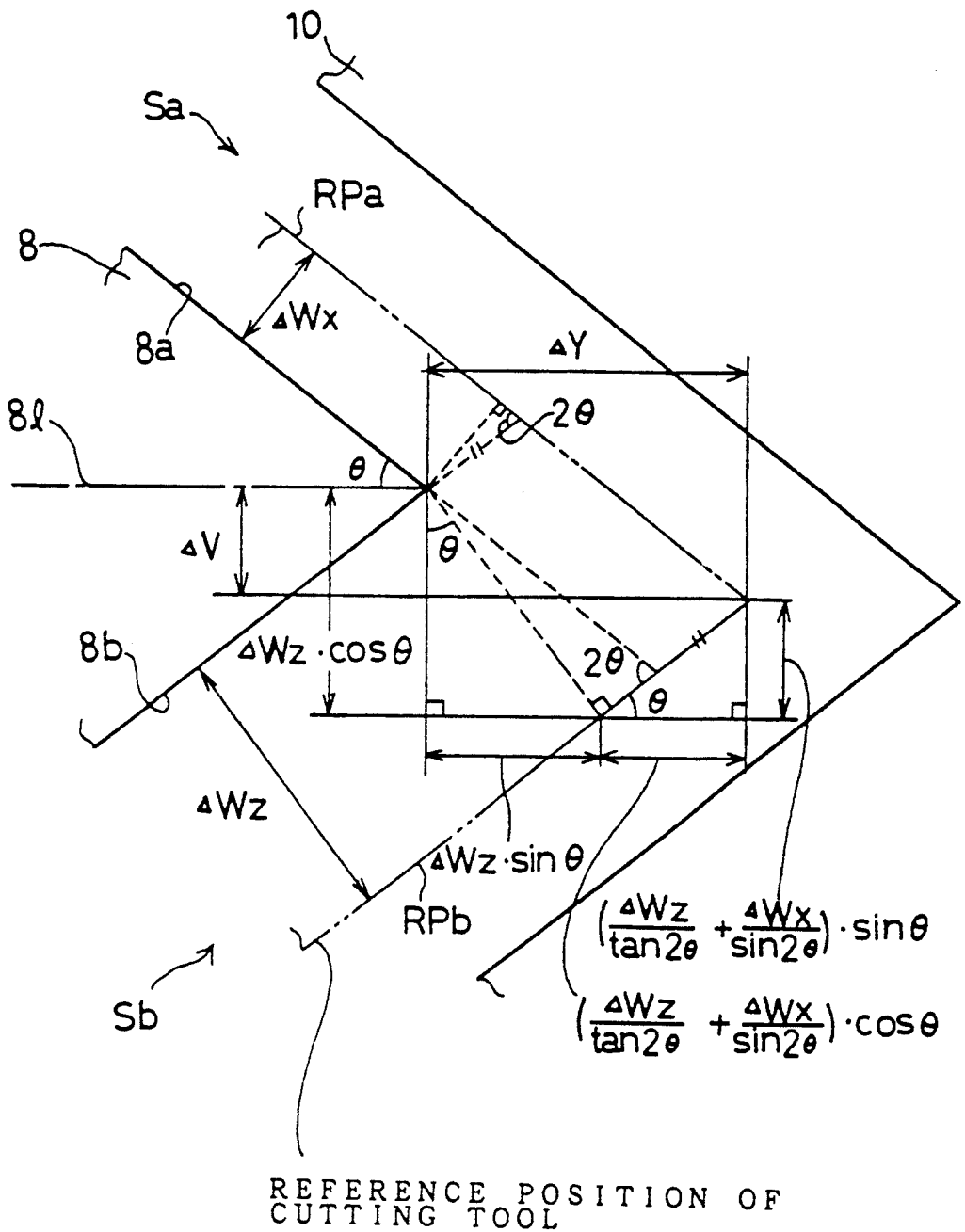
FIG. 7 is a diagram showing the relation between the amount of displacement of the cutting tool and the variation of the width of the slit.

In these expressions, θ is an angle between the edge portion 8a or the edge portion 8b and the central line 8l as shown in FIG. 7. The position of the pointed end of the cutting tool 8 is thus calculated with respect to the longitudinal direction (the direction Y) of the cutting tool 8 and the vertical direction (the direction V) perpendicular to the direction Y based on a pair of diffraction patterns in the X and Z directions.

After calculation of the amounts of displacement ΔY and ΔV of the cutting tool 8, the computer 20 transmits signals in step 42 to a controller 18 through the interface 16 for starting the drive device disposed within the tool base 7 to move the cutting tool 8 in the longitudinal direction and/or the vertical direction. The edge portions 8a and 8b of the cutting tool 8 are thereby positioned at a reference position shown by two-dot chain line in FIG. 7.

After the cutting tool 8 has been thus positioned with respect to the X and Z directions, signals from the photo-diodes 22-1 to 22-4 disposed in the Y direction are analyzed in step 44.

Figure 4A:
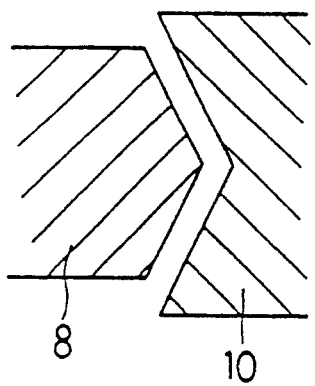
FIGS. 4(A) to 4(C) are schematic view showing relation between the cutting tool and the reference plate shown in FIG. 1 at different situations.

If the cutting tool 8 maintains its proper configuration as shown in FIG. 4(A), the combination of the H and L signals from the photo-diodes 22-1 to 22-4 with respect to the Y direction is the same as that of the photo-diodes 12-1 to 12-4 with respect to the X direction or the the photo-diodes 23-1 to 23-4 with respect to the Z direction. Thus, the cutting tool 8 is judged as being proper as long as such signals are inputted.

Figure 4B:
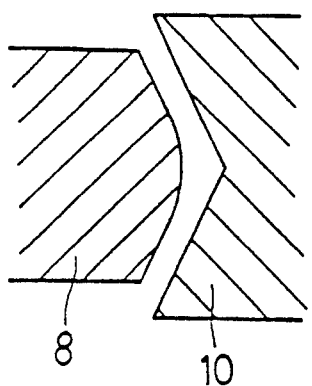
Figure 4C:
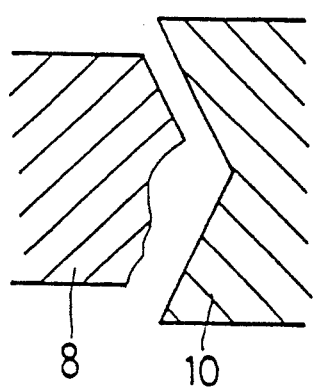

On the other hand, if the edge portions 8a and 8b of the cutting tool 8 have been worn as shown in FIG. 4(B) or have been damaged as shown in FIG. 4(C), only the outputs of the photo-diodes 22-1 to 22-4 in the direction Y becomes quite different from those of the photo-diodes 12-1 to 12-4 in the direction X and the photo-diodes 23-1 to 23-4 in the direction Z. In such a case, the process proceeds from step 46 to step 48 for displaying that the cutting tool 8 is not proper.

After the position of the cutting tool 8 has been thus adjusted, the position of the cutting tool 8 is fixed relative to the tool base 7 to machine a workpiece (not shown).

In the above embodiment, a memory 100 storing optimum diffraction patterns in the directions X, Y and Z may be connected with the computer 20 as shown in FIG. 1. The position or condition of the edge of the cutting tool 8 can be estimated by comparing the detected patterns in the directions X, Y and Z with their corresponding optimum diffraction patterns.

As described above, the device for detecting the edge of the cutting tool according to this embodiment can detect the slit width W from the diffraction patterns detected by the photo-diodes or the combination of the H and L signals, so that the position and condition of the cutting tool can be detected with desired accuracy by changing the number of combinations of the H and L signals through increasing or decreasing the number of the photo-diodes.

Second Embodiment

Figure 8:
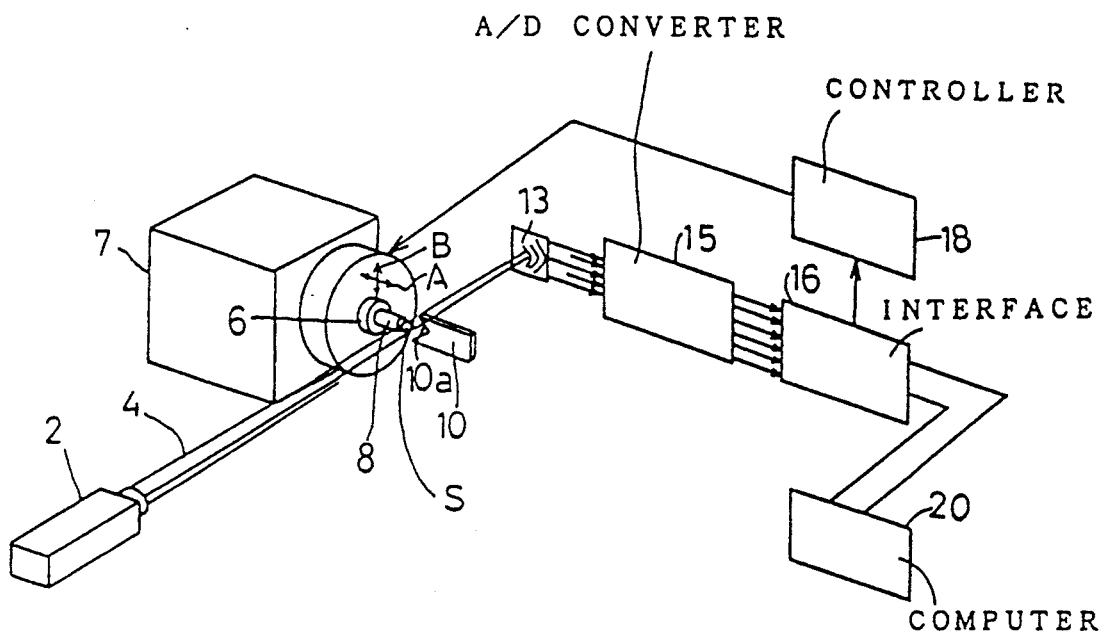
FIG. 8 is a schematic perspective view of a device for detecting a position of an edge of a cutting tool according to a second embodiment of the present invention.
Figure 9:
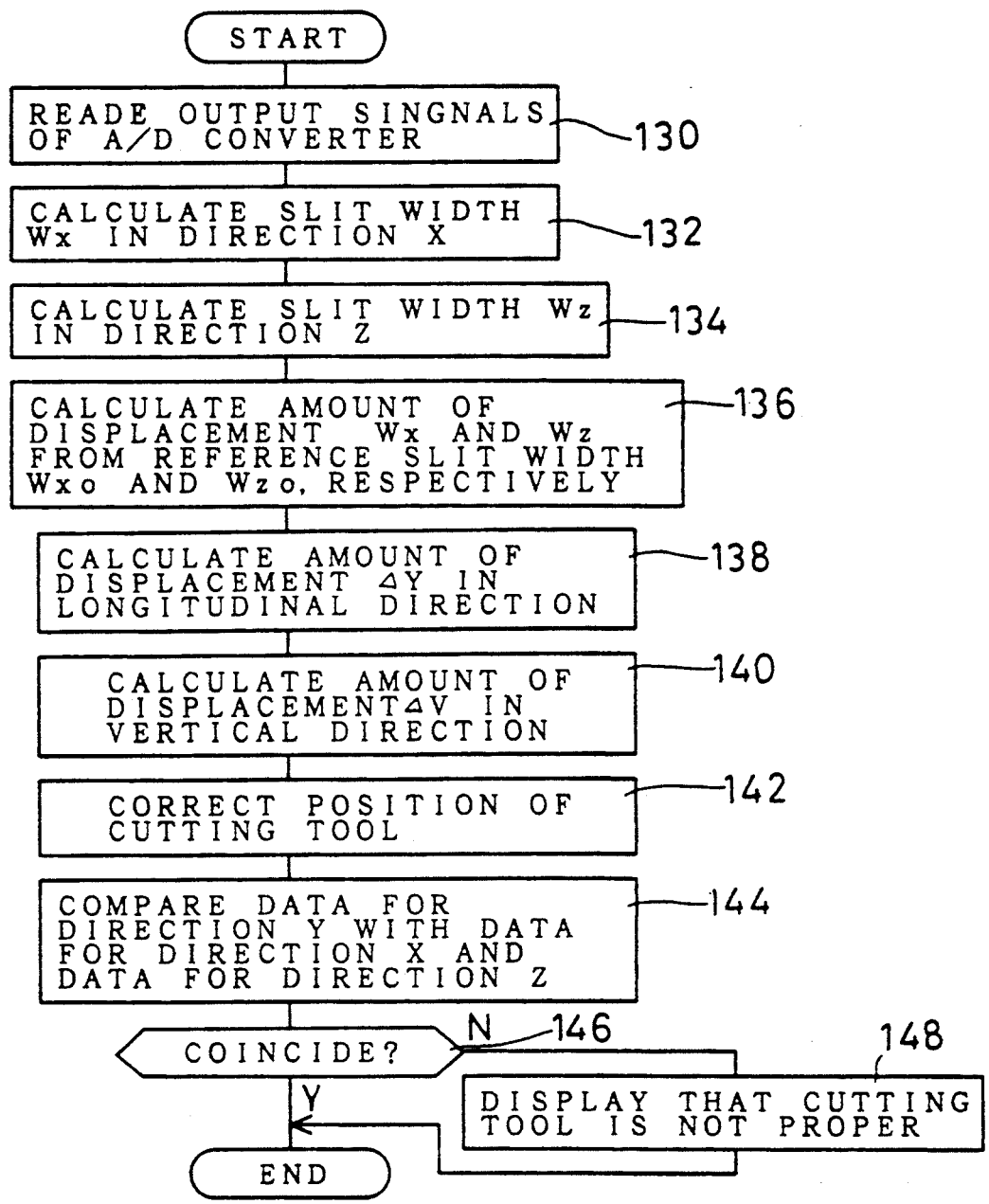
FIGS. 9, 10 and 11 are flow charts showing the process performed by the computer shown in FIG. 8.

Referring to FIG. 8, there is shown a device for detecting the position of an edge of a cutting tool according to a second embodiment. The device includes a CCD camera 13 in place of the group of the light sensors 12 of the first embodiment. Signals from the CCD camera 13 are inputted to a computer 20 through an A/D converter 15. Other components of the second embodiment are structurally the same as those of the first embodiment. In this embodiment, after reading the outputs from the A/D converter 15, the computer 20 calculates the slit width Wx in the direction X and the slit width Wz in the direction Z by a neural network in steps 132 and 134. The process in the neural network will be hereinafter explained in detail. The process in steps 136 to 148 is the same as that in steps 36 to 48 of the first embodiment, and therefore, the explanation of this process is omitted.

Figure 10:
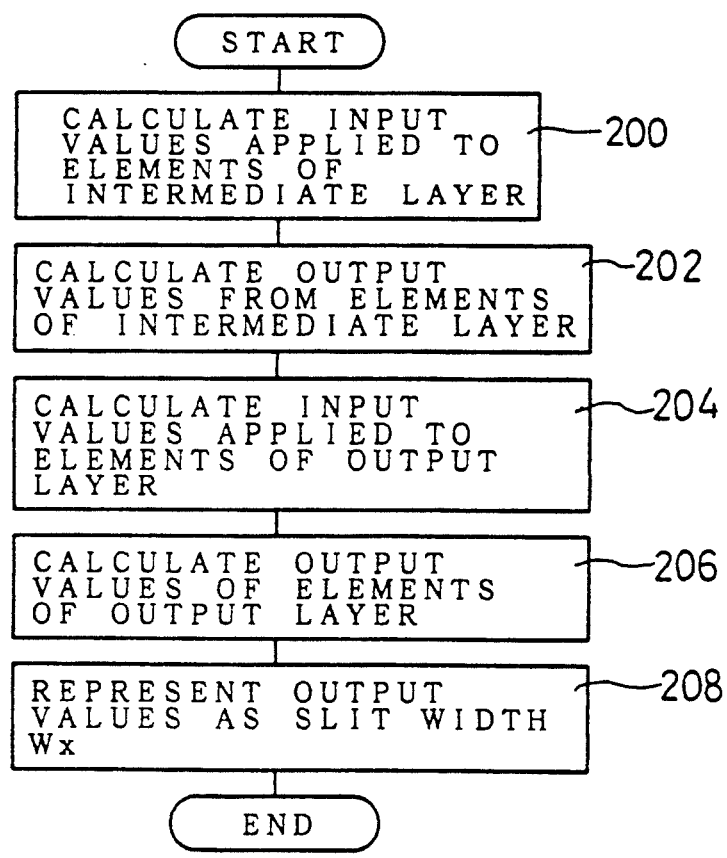
Figure 12:
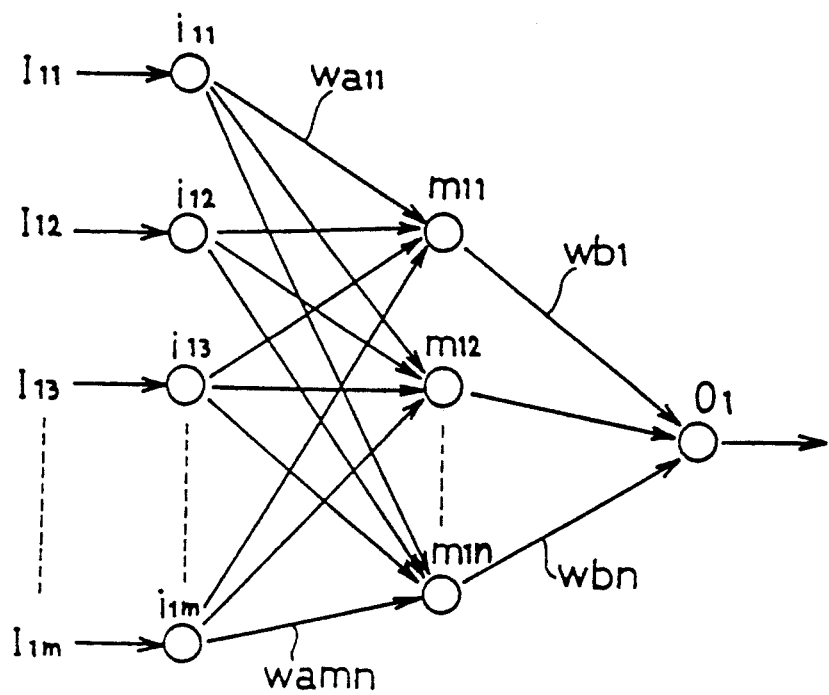
FIG. 12 is a diagram showing a neural network used in the second embodiment.

The detail of the process in step 132 is shown in FIG. 10. The neural network of this embodiment is of a three layer construction having an input layer, an intermediate layer and an output layer as shown in FIG. 12. Values representing intensity I11 to I1m at positions Px1, Px2—Pxm in the direction X are inputted to elements i11 to i1m of the input layer, respectively. Although in this embodiment the positions Px1 to Pxm are equally spaced from each other, they are not required to be equally spaced from each other.

Firstly, inputs of elements m11 to m1n of the intermediate layer are calculated in step 200. For example, the input Uk to the element m1k of the intermediate layer is calculated by the following expression (3):

$$Uk = \sum_{s=1}^{m} Wask\, Ils + \theta k \tag{3}$$

In this expression, Wask is a combination weight factor between the elements i11 to i1m of the input layer and the elements m11 to m1n of the intermediate layer, and θk is a bias.

The outputs of the elements m11 to m1n of the intermediate layer are thereafter calculated by using the sigmoid function in step 202. For example, the output Hk of the k-th element of the intermediate layer is calculated by the following expression (4):

$$Hk = f(Uk) \tag{4}$$

An input S1 of the element 01 of the output layer is thereafter calculated in step 204 by the following expression (5):

$$S1 = \sum_{s=1}^{n} Wbs\, Hs + \gamma \tag{5}$$

In this expression, Wbs is a combination weight factor between the elements m11 to m1n of the intermediate layer and the element 01 of the output layer, and γ is a bias.

An output of the element 01 of the output layer is thereafter calculated in step 206 by the following expression, using the sigmoid function:

$$01 = f(S1) \tag{6}$$

The output of the element 01 thus calculated is used to represent the slit width Wx in the direction X. The slit width Wz in the direction Z is calculated in step 134 in the same manner as the slit width Wx. The same process as the first embodiment is thereafter performed to make correction of the position of the cutting tool 8 or to check as to whether the cutting tool 8 is proper.

Figure 11:
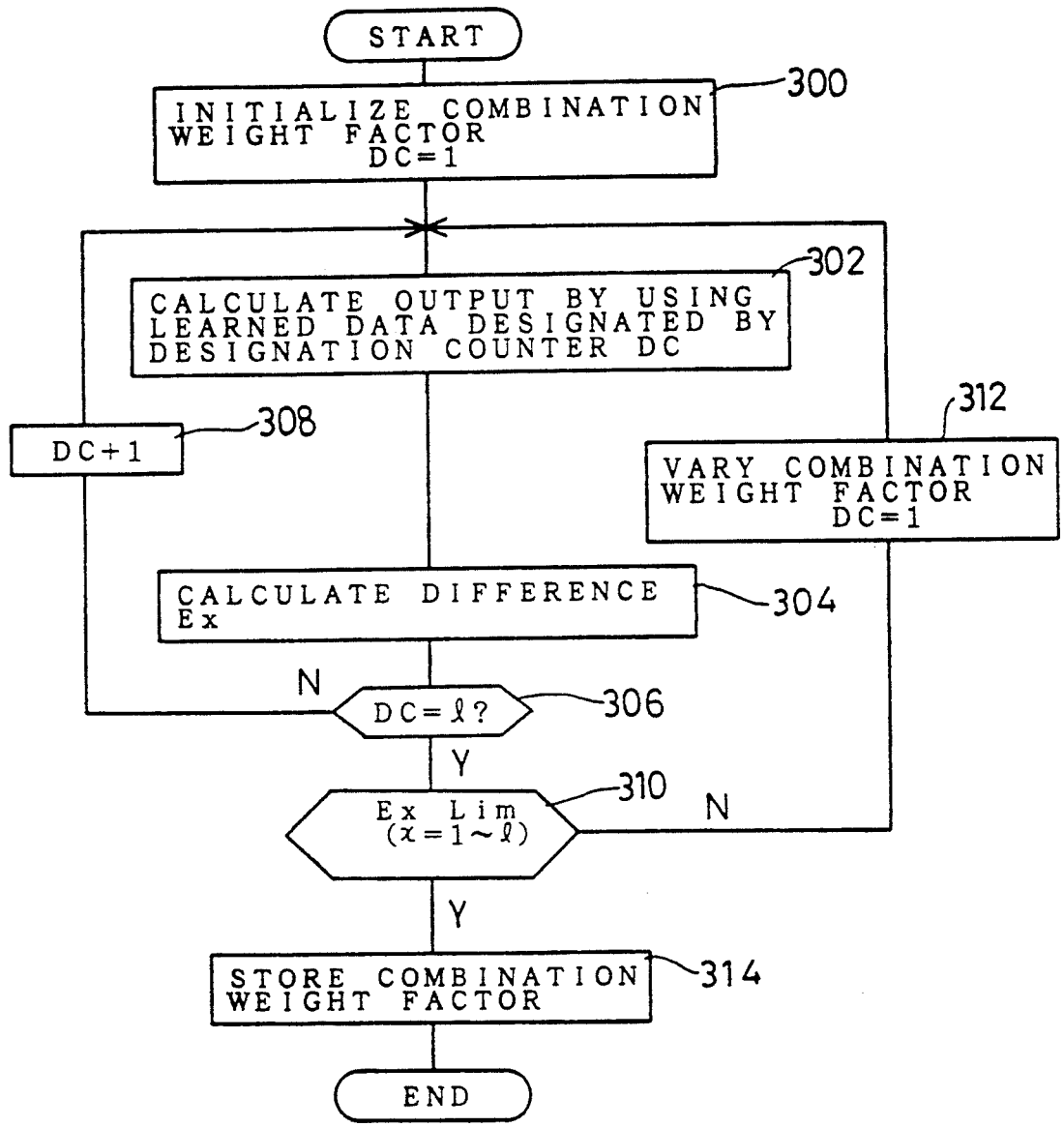

FIG. 11 shows a process to determine the combination weight factors Wask and Wbs of the neural network shown in FIG. 12 by using a well-known back propagation method. This process is carried out by using learned data before measurement of the position. The learned data include the data of the light intensity and the data of the slit width and is inputted to the neural network. The data of the light intensity is measured at positions Px1, Px2—Pxn corresponding to the slit width T1, T2—Tl between the reference plate 10 and the cutting tool 8, respectively, by sequentially changing such width. The process to determine each of the combination weight factors Wask and Wbs will now be explained. In step 300, the combination weight factor is firstly set to an initial value, and a designation counter DC for designation of the learned data is set to 1. The learned data designated by the designation counter DC is thereafter inputted to the neural network so as to obtain the output signal 01 in step 302. The difference Ex between the slit width represented by the output signal 01 and the slit width Tn included in the learned data is then calculated in step 304. Step 306 performs to judge as to whether such difference has been calculated for all of the learned data based on the value of the designation counter DC. The same process is repeated by returning from step 306 to step 302 via step 308 until the difference has been calculated for all of the learned data. Upon completion of calculation of the difference for all of the learned data, the process proceeds from step 306 to step 310 which judges as to whether all of the calculated difference is smaller than the allowable value Lim. If any of the calculated difference exceeds the allowable value Lim, the combination weight factor is changed to another value and the designation counter DC is reset to 1 in step 312. The process is thereafter returned to step 302. When all of the calculated difference has become smaller than the allowed value by repeating the above process, the process proceeds to step 314 in which the combination weight factor thus optimized is stored.

Meanwhile, it is well known in the art how the combination weight factor should be changed. For example, such method is disclosed in detail in U.S. patent application Ser. No. 07/731,472 assigned to the same assignee as the present application.

The learning process of the neural network is thus performed, and the measuring process as the first embodiment is thereafter performed. The device of the second embodiment can measure the slit width more accurately within more broader range than the device of the first embodiment.

Figure 13:
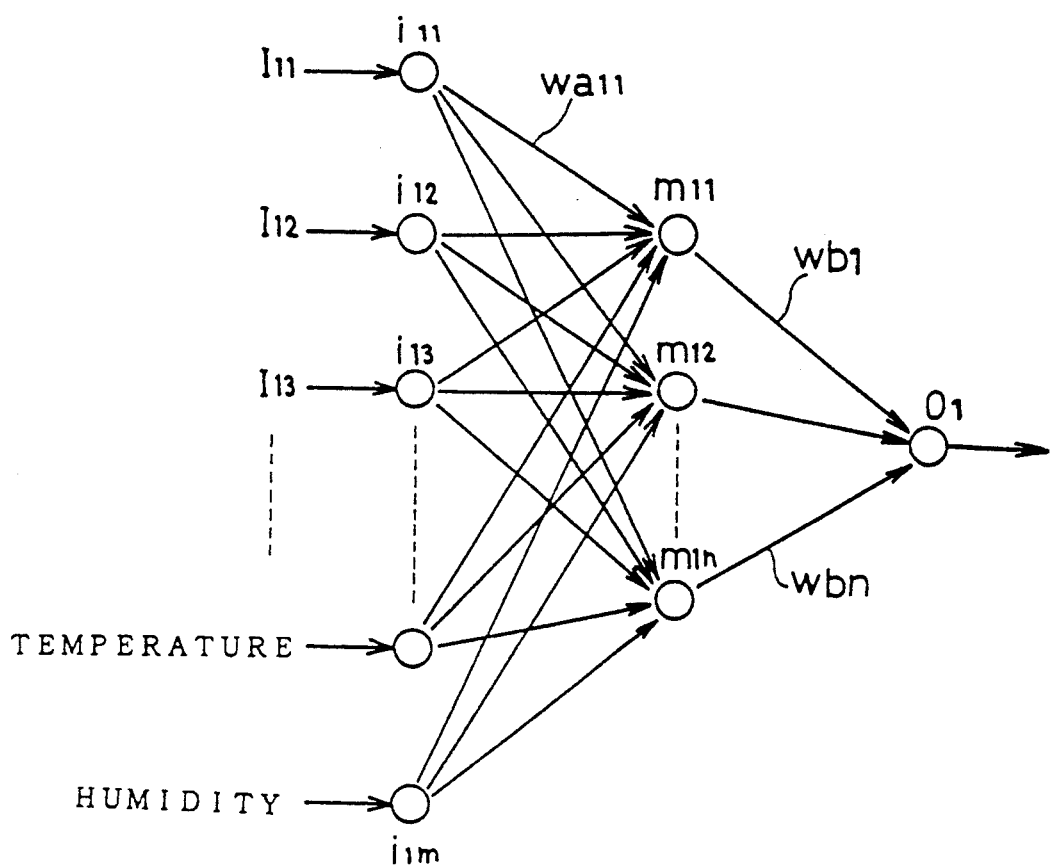
FIG. 13 is a diagram showing another neural network.

Further, as shown in FIG. 13, data of environmental factors such as room temperature and humidity which may produce a measurement error may be inputted to the neural network together with the data of light intensity. The data of the environmental factors may be detected by sensors (not shown). Thus, the learning process and the calculation process by the neural network can be performed in consideration of the additional data of the room temperature, the humidity, etc. With such construction, the measurement can be performed highly accurately without influence of the room temperature, the humidity, etc.

Although in the above embodiment, the slit width W has been calculated by processing the image of the the diffracted stripes picked up by the CCD camera 13, the slit width W can be obtained through calculation of the pitch of the diffracted stripes. In such a case, its is also possible to determine as to whether the edge of the cutting tool 8 is worn or damaged by comparing the slit width W at the two edge portions 8a, 8b with that at the pointed end.

Further, it is not necessary to position the reference plate 10 and the cutting tool 8 in the same plane. In case that the reference plate 10 and the cutting tool 8 are separated from each other in a direction along the laser light, such information of distance between the cutting tool 8 and the reference plate 10 is inputted to the computer 20. The computer 20 processes the image in consideration of this information, so that the position of the cutting tool 8 can be detected.

Figure 14:
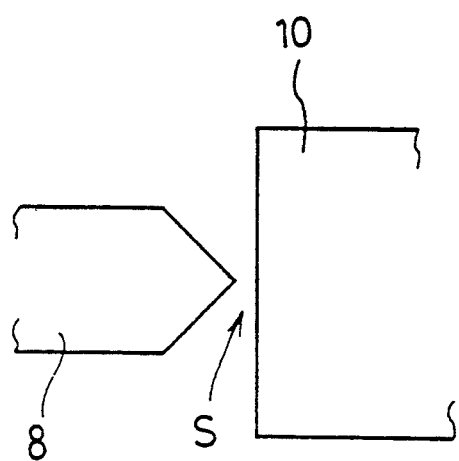
FIG. 14 is a schematic view of the reference plate having another configuration.

Additionally, if it is not necessary to detect the position of the cutting tool 8 in the vertical direction, the reference plate 10 may have a straight edge as shown in FIG. 14 since it is only necessary to detect the position of the cutting tool 8 in its longitudinal direction.

According to a device of the present invention, since a slit width is detected from a diffraction pattern, the position or configuration of a cutting tool can be detected highly accurately without using a microscope etc. which is expensive and has a large size. Therefore, the machining accuracy can be easily kept proper, and the device is very useful in a practical use.

While the invention has been described with reference to a preferred embodiment, it is to be understood that modifications or variation may be easily made without departing from the spirit of this invention which is defined by the appended claims.

What is claimed is:

1. A device for detecting a position of an edge of a cutting tool comprising:
    a reference plate positioned to form a slit extending in a direction transverse to the longitudinal direction of the cutting tool between the edge of the cutting tool and said reference plate;
    a laser light source for irradiating a laser light to said slit;
    detecting means for detecting, along at least two nonparallel directions, light intensity values of a diffraction pattern created through diffraction of the laser light by said slit; and
    processing means for determining the position of the edge of the cutting tool based on a comparison of output signals of said detecting means corresponding to said light intensity value along said two directions.

2. The device as defined in claim 1 wherein said reference plate includes a substantially V-shaped end portion corresponding to the edge of the cutting tool which is of substantially V-shaped configuration and has a pointed end and a pair of edge portions extending obliquely relative to the longitudinal direction of the cutting tool from the pointed end; said slit includes a pair of slit portions formed between said end portion of said reference plate and a pair of said edge portions; said detecting means detects a pair of diffraction patterns created by a pair of said slit portions; and said processing means determines the position of the edge of the cutting tool in the longitudinal direction and the direction perpendicular thereto based on said output signals corresponding to a pair of said slit portions.

3. The device as defined in claim 1 wherein said detecting means includes a sensor to detect the light intensity at different positions spaced from each other in a direction substantially perpendicular to said slit, a comparator for comparing the light intensity at said different positions with a predetermined set value; and said processing means determines the position of the edge of the cutting tool based on the result of comparison by said comparator.

4. The device as defined in claim 1 wherein said detecting means includes a sensor to detect the light intensity at different positions spaced from each other in a direction substantially perpendicular to said slit; means is provided to convert the outputs of said sensor to digital signals; and said processing means includes a neural network to determine the position of the edge of the cutting tool based on said digital signals corresponding to the light intensity at said different positions.

5. A method for detecting a position of an edge of a cutting tool comprising the steps of:

positioning a reference plate in front of the edge of the cutting tool to form a slit extending in a direction transverse to the longitudinal direction of the cutting tool between the edge of the cutting tool and said reference plate;

irradiating a laser light to said slit;

detecting, along at least two nonparallel directions, light intensity values of a diffraction pattern created through diffraction of the laser light by said slit; and determining the position of the edge of the cutting tool based on a comparison of the detected light intensity values of the diffraction pattern.

6. A device for detecting the position of an edge of a cutting tool comprising:

a reference plate positioned to form a slit between the edge of the cutting tool and said reference plate;

a laser light source for irradiating a laser light toward said slit;

sensing means receiving said laser light passing through said slit and including at least one group of light sensitive elements which are arranged and spaced in a direction perpendicular to said slit for enabling said light sensitive elements to output a combination of signals corresponding to a diffraction pattern of said laser light received by said sensing means; and processing means including a neural network responsive to said combination of signals output from said light sensitive elements for detecting the position of said edge of said cutting tool relative to said reference plate in accordance with an input-to-input relation which has been in advance taught into said neural network.

7. A method for detecting the position of an edge of a cutting tool comprising the steps of:

positioning a reference plate to form a slit between the edge of the cutting tool and said reference plate;

irradiating a laser light from a laser light source toward said slit;

receiving on sensing means said laser light passing through said slit; said sensing means including at least one group of light sensitive elements which are arranged and spaced in a direction perpendicular to said slit so that said sensing means outputs a combination of signals corresponding to a diffraction pattern of said laser light; and detecting the position of said edge of said cutting tool relative to said reference plate based upon data signals which a neural network outputs upon receipt of said combination of signals from said sensing means in accordance with an input-to-output relation which has been taught in advance into said neural network.

* * * * *